US006694872B1

(12) United States Patent
LaBelle et al.

(10) Patent No.: US 6,694,872 B1
(45) Date of Patent: Feb. 24, 2004

(54) IN-LINE MICROEMBOSSING, LAMINATING, PRINTING, AND DIECUTTING

(75) Inventors: Scott R. LaBelle, Bloomington, MN (US); Bill L. Bohn, Eden Prairie, MN (US)

(73) Assignee: Holographic Label Converting, Inc., Edina, MN (US)

(*) Notice: Subject to any disclaimer, the term of this patent is extended or adjusted under 35 U.S.C. 154(b) by 0 days.

(21) Appl. No.: 09/635,302

(22) Filed: Aug. 9, 2000

Related U.S. Application Data (63) Continuation of application No. 09/336,032, filed on Jun. 18, 1999, now abandoned.

(51) Int. Cl.[7] .................................................. B41F 19/02
(52) U.S. Cl. ........................................... 101/23; 101/28
(58) Field of Search .............................. 101/23, 24, 25, 101/28; 156/209

(56) References Cited

U.S. PATENT DOCUMENTS

| 482,267 A | 9/1892 | Newton |
| 899,624 A | 9/1908 | Sayre .......................... 101/377 |

(List continued on next page.)

FOREIGN PATENT DOCUMENTS

| DE | 2258329 | 6/1974 | ........... D06C/23/04 |
| DE | 3206718 | 9/1983 | ............. B29C/7/22 |
| DE | 322084 A | * 2/1991 | |
| DE | 3926918 A | * 2/1991 | ........... B29C/59/04 |
| EP | 338378 A | * 10/1989 | ............. B05C/1/16 |
| GB | 0808900 | 2/1959 | ........................ 38/4 |
| JP | 01-130933 | 5/1989 | ........... B29C/59/04 |
| JP | 4-107503 | 4/1992 | ............. G02B/5/18 |
| JP | 10-006398 | 1/1998 | ........... B29C/59/04 |

OTHER PUBLICATIONS

"In–Line Holography: A Watershed Crossed", *Holography News, 10*(5), (1996), pp. 1,2 & 7.
"Inline Holography the Answer or the Question", *Holography News, 14*(2), (2000), p. 2.
"Optimation Expanding In–Line Production to 28", *Holography News, 14*(2), (2000), p. 3.
"ET Line (Labels)", http://www.omet.it/ing/macc/et/et255g.html, 1p., (1999).
"Foilsaver Makes High Speed Rotary Foil Stamping Economical", http://htm.com/holography/total/foilsaver1.html, Foilsaver Rotary Hot Stamping, 1–3 p.

(List continued on next page.)

*Primary Examiner*—Daniel J. Colilla
(74) *Attorney, Agent, or Firm*—Schwegman, Lundberg, Woessner & Kluth, P.A.

(57) ABSTRACT

Conventional methods of making holographic labels use separate, stand-alone machines for embossing, laminating, printing, and diecutting. This means that embossed material must be transferred and loaded into the laminator, that laminated material must be transferred and loaded into the printer, and that printed material must be transferred and loaded into the diecutter. Unfortunately, transferring and loading material into the separate machines is not only time consuming but also introduces errors, particularly in achieving accurate registration, or alignment, of embossed, printed, and diecut patterns. Accordingly, the inventors devised an in-line rotary microembosser for use with a rotary laminator, printer, and/or diecutter. One embodiment, or implementation, of the invention includes a rotary microembosser operatively coupled in line with a rotary laminator, a rotary printer, a rotary diecutter, or another web processing device to concurrently process a continuous web. The apparatus not only eliminates one or more of the machine-transfer and machine-loading delays which occur when using a separate embosser, laminator, printer, and diecutter, but also reduces the need to correct registration errors at each separate machine.

21 Claims, 11 Drawing Sheets

U.S. PATENT DOCUMENTS

| | | | |
|---|---|---|---|
| 3,229,620 A | | 1/1966 | Rogers et al. ............... 100/308 |
| 3,487,778 A | * | 1/1970 | Muth et al. ................. 101/378 |
| 3,721,189 A | | 3/1973 | Bray ................... 101/382 MV |
| 3,750,571 A | | 8/1973 | Germann ................ 101/415.1 |
| 3,949,672 A | | 4/1976 | Cadmus, Jr. ................ 101/368 |
| 4,023,887 A | | 5/1977 | Speers |
| 4,066,014 A | | 1/1978 | van Haaften ............... 101/157 |
| 4,095,498 A | | 6/1978 | Biggar, III ................... 83/346 |
| 4,116,594 A | | 9/1978 | Leanna et al. ................. 425/3 |
| 4,130,042 A | | 12/1978 | Reed ........................... 83/887 |
| 4,155,693 A | | 5/1979 | Raley ......................... 425/363 |
| 4,312,686 A | | 1/1982 | Smith et al. ................ 156/209 |
| 4,460,429 A | * | 7/1984 | Coscia et al. ............... 156/384 |
| 4,641,575 A | * | 2/1987 | Cavagna ...................... 101/23 |
| 4,698,258 A | * | 10/1987 | Harkins, Jr. ................ 156/209 |
| 5,109,767 A | | 5/1992 | Nyfeler et al. ................ 101/23 |
| 5,327,825 A | | 7/1994 | Parker et al. |
| 5,397,290 A | | 3/1995 | Hellenthal ................... 492/46 |
| 5,464,690 A | | 11/1995 | Boswell |
| 5,492,370 A | | 2/1996 | Chatwin et al. ............ 283/110 |
| 5,495,981 A | | 3/1996 | Warther ....................... 229/71 |
| 5,521,722 A | | 5/1996 | Colvill et al. ............... 358/500 |
| 5,533,002 A | | 7/1996 | Abraham ................ 369/275.3 |
| 5,585,144 A | | 12/1996 | Waitts ........................ 427/258 |
| 5,603,259 A | | 2/1997 | Gross et al. .................. 101/33 |
| 5,629,068 A | * | 5/1997 | Miekka et al. ................ 359/15 |
| 5,642,226 A | | 6/1997 | Rosenthal ................... 359/619 |
| 5,643,678 A | | 7/1997 | Boswell |
| 5,665,194 A | | 9/1997 | Kay ........................... 156/325 |
| 5,670,003 A | | 9/1997 | Boswell ...................... 156/220 |
| 5,672,410 A | | 9/1997 | Miekka et al. ............. 428/148 |
| 5,674,580 A | | 10/1997 | Boswell |
| 5,698,333 A | | 12/1997 | Benoit et al. ............... 428/516 |
| D390,246 S | | 2/1998 | Cienfuegos-Jovellanos |
| 5,715,316 A | | 2/1998 | Steenblik et al. ............. 380/54 |
| 5,722,319 A | | 3/1998 | Hirano ......................... 101/23 |
| 5,746,864 A | | 5/1998 | Reiter et al. ................. 156/220 |
| 5,753,349 A | | 5/1998 | Boswell ...................... 428/195 |
| 5,759,683 A | | 6/1998 | Boswell ...................... 428/334 |
| 5,783,017 A | | 7/1998 | Boswell |
| 5,810,957 A | | 9/1998 | Boswell |
| 5,810,965 A | | 9/1998 | Fwu ............................ 156/359 |
| 5,858,512 A | | 1/1999 | Dit Picard et al. .......... 428/171 |
| 5,862,750 A | | 1/1999 | Dell'Olmo ................... 101/32 |
| 5,932,150 A | * | 8/1999 | Lacey ........................ 264/1.34 |
| 5,937,759 A | | 8/1999 | Mitsam et al. .............. 101/378 |
| 5,967,009 A | | 10/1999 | Truttmann et al. ............. 83/52 |
| 6,000,106 A | | 12/1999 | Kampfer et al. .............. 24/452 |
| 6,026,725 A | | 2/2000 | Okonski .................. 83/698.21 |
| 6,059,003 A | | 5/2000 | Wittkopf ..................... 156/555 |
| 6,062,134 A | | 5/2000 | Eitel et al. ..................... 101/28 |
| 6,087,940 A | | 7/2000 | Caperna et al. |
| 6,103,989 A | * | 8/2000 | Jennings et al. ............ 156/249 |
| 2002/0000143 A1 | | 1/2002 | Okonski ........................ 83/72 |

OTHER PUBLICATIONS

"James River Products, Inc.—Holographic Productin Machinery and Technology", http://hmt.com/holography/jrp/index.html, 1–8 p.

"Machine Specifications Holographic Embossing Machines", http://hmt.com/holography/jrp/machinespec.html, 1–4 p.

"NovaVision's In–Line Embossing Process", *Holography News*, vol. 10 No. 5, 3 pages, (Oct. 1996).

Omet, "ET Line (Labels)", http://www.omet.it/ing/macc/et/et255gb.html, 1 p.

Omet, "TV Line (Napkins/Place–Mats)", http://www.omet.it/ing/macc/tv/opt.html, 1 p.

* cited by examiner

IN-LINE MICROEMBOSSING, LAMINATING, PRINTING, AND DIECUTTING

"This application is a continuation of U.S. patent application Ser. No. 09/336,032, filed on Jun. 18, 1999 (the '032 Application, now abandoned). The '032 Application is incorporated herein by reference."

RELATED APPLICATION

The present application is related to a co-assigned and co-filed United States patent application entitled Microembosser for Faster Production of Holographic Labels. This related application is incorporated herein by reference.

TECHNICAL FIELD

The present invention concerns microembossing, printing, laminating, and diecutting technologies, especially as used in the manufacture of holographic labels or stickers.

BACKGROUND OF THE INVENTION

Microembossing is a process of imprinting or cutting microscopic grooves into a layer of material, sometimes called a substrate. One use of microembossing is to emboss a hologram—a three-dimensional image of an object—on a paper-thin substrate of reflective plastic. The embossed substrate can then be used as part of a holographic label.

Holographic labels are used on a variety of articles of manufacture for security, authenticity, or aesthetic appeal. For example, holographic labels are used on compact discs, computer software, cosmetics, watches, and sporting goods. Other uses include clothing hang tags, automobile-registration certificates, fine-jewelry certificates, concert and sporting-event tickets, recreational passes, credit cards, passports, driver licenses, postage stamps, government bonds and certificates, and so forth.

Producing holographic labels or stickers generally entails a multi-pass process, which begins with forming a specific diffractive pattern, for example, a five-by-five array of 25 three-dimensional bald eagle images, on a thin rectangular sheet of metal known as a stamping shim. Using the stamping shim like a printing plate, a microembosser repeatedly imprints or embosses the array of bald eagles onto a long section of metalized polyester film, called a web. The embossed film is then typically rolled and loaded into a separate laminating machine, which laminates, or glues, a pressure-sensitive adhesive material to the back of the web, forming the peel-away part of each sticker.

The laminated web is then rolled and loaded onto a printer, which prints images at designated positions on the web. For example, one could print a ring of white stars around each of the 25 embossed eagle images, using a printing plate which includes a corresponding five-by-five array of 25 star rings. To ensure proper registration, or alignment, of the array of star rings with the array of eagle images, some printers include special controls that adjust relative position of the printing plate and the web during printing. However, these controls generally limit printing speed and waste some of the web, which is rolled up as it exits the printer.

The manufacturing process then continues by loading the rolled web of embossed and printed images onto a separate, stand-alone diecutter which cuts each star-encircled eagle image from the web to form a sticker of a certain shape. The diecutter typically includes a die cylinder (or steel-rule die) with a specific pattern of raised cutting edges on its surface. For example, the die cylinder could include a five-by-five array of 25 square-shaped cutting edges that corresponds to the array of star-encircled eagles on the web. In operation, the die cylinder rolls over the web of star-encircled eagle images, cutting out each image as a separate square-shaped sticker. To ensure registration of the array of square-shaped cutting edges with the array of star-encircled eagles, it is often necessary to stop diecutting to manually adjust position of the die cylinder or the web.

One problem with this process is its use of separate, stand-alone machines for embossing, laminating, printing, and diecutting. This means that the web must be unrolled, rerolled, and transferred from one machine to the next, ultimately slowing the manufacturing process. Moreover, the web stretches and contracts during and after each stage of manufacture, often requiring adjustments to correct registration of embossed, printed, and/or diecut patterns—a procedure which further slows the manufacturing process. Accordingly, there is a need for a better way of making holographic stickers and labels.

SUMMARY OF THE INVENTION

To address this and other needs, the inventors have developed an in-line rotary microembosser for use with a rotary laminator, printer, and/or diecutter. One embodiment, or implementation, of the invention includes a rotary microembosser operatively coupled in line with a rotary laminator, a rotary printer, a rotary diecutter, or another web processing device to concurrently process a continuous web. This exemplary arrangement not only eliminates one or more of the machine-transfer and machine-loading delays which occur when using a separate embosser, laminator, printer, and diecutter, but also reduces the need to correct registration errors at each separate machine. Accordingly, this and various other embodiments of the invention reduce the time required to manufacture products, such as holographic labels.

DESCRIPTION OF EXEMPLARY EMBODIMENTS

The following detailed description, which references and incorporates the above-identified figures, describes and illustrates specific embodiments of the invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Figure 1A:
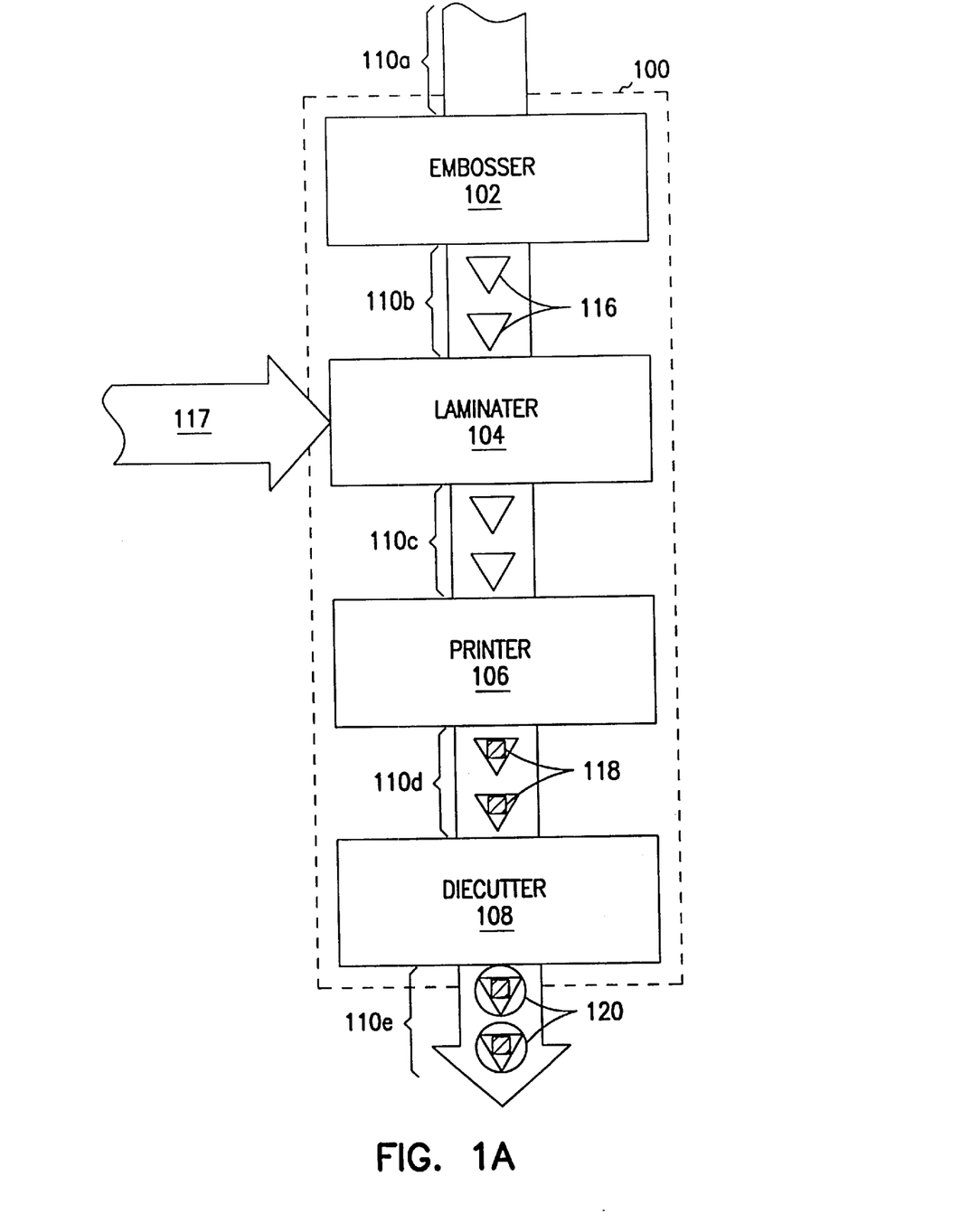
FIG. 1A is a block diagram of a unique in-line rotary web processing apparatus 100, including a rotary embosser 102, a laminator 104, a printer 106, and a die-cutter 108 operating concurrently on a continuous web of material 110.

FIG. 1A shows a block diagram of an exemplary embodiment of an in-line rotary web processing apparatus (and method) 100, embodying numerous inventive teachings. Though the apparatus and method have a wide variety of uses, it is especially useful for forming diecut, pressure-sensitive labels and stickers with reflective and/or diffractive images, and printed images, such as barcoding or serial numbers. For example, the in-line apparatus and method are also useful for forming compact disks or other mediums bearing digital or analog information and for forming lenses or portions of lenses. The apparatus and process are equally applicable to both hard and soft embossing applications, though for clarity the description focuses on a hard embossing application.

In particular, apparatus 100 includes a rotary embosser 102, a laminator 104, a printer 106, and a diecutter 108. The embosser 102, laminator 104, printer 106, and die-cutter 108 are arranged "in line," that is, to operate concurrently and sequentially on a continuous web 110 which feeds through the apparatus. (Other embodiments of the invention include additional web-processing devices, omit the laminator, printer, or diecutter, and/or reorder the laminator, printer, and diecutter. Also, other embodiments arrange two or more of the stages vertically.) In the exemplary embodiment, web 110 feed through each machine at a substantially constant rate of speed, for example, 100–200 feet (30–60 meters) per minute.

Web 110 includes five distinct sections 110a, 110b, 110c, 110d, and 110e, delineated by the embosser, laminator, printer, and diecutter. Section 110a represents the pre-embosser state of web 110; section 110b includes embossed reflective and/or diffractive images or regions 116; section 110c includes a laminated backing web 117; section 110d includes print images or regions 118 as well as embossed regions 116; and section 120 includes die-cut images or regions 120, print regions 118, and embossed regions 116. The in-line arrangement facilitates not only registration of regions 116, 118, and 120, but also higher processing speeds than conventional processes which rollup the web at the output of the microembosser, the laminator, or the printer and transfer to another web-processing device.

Figure 1B:
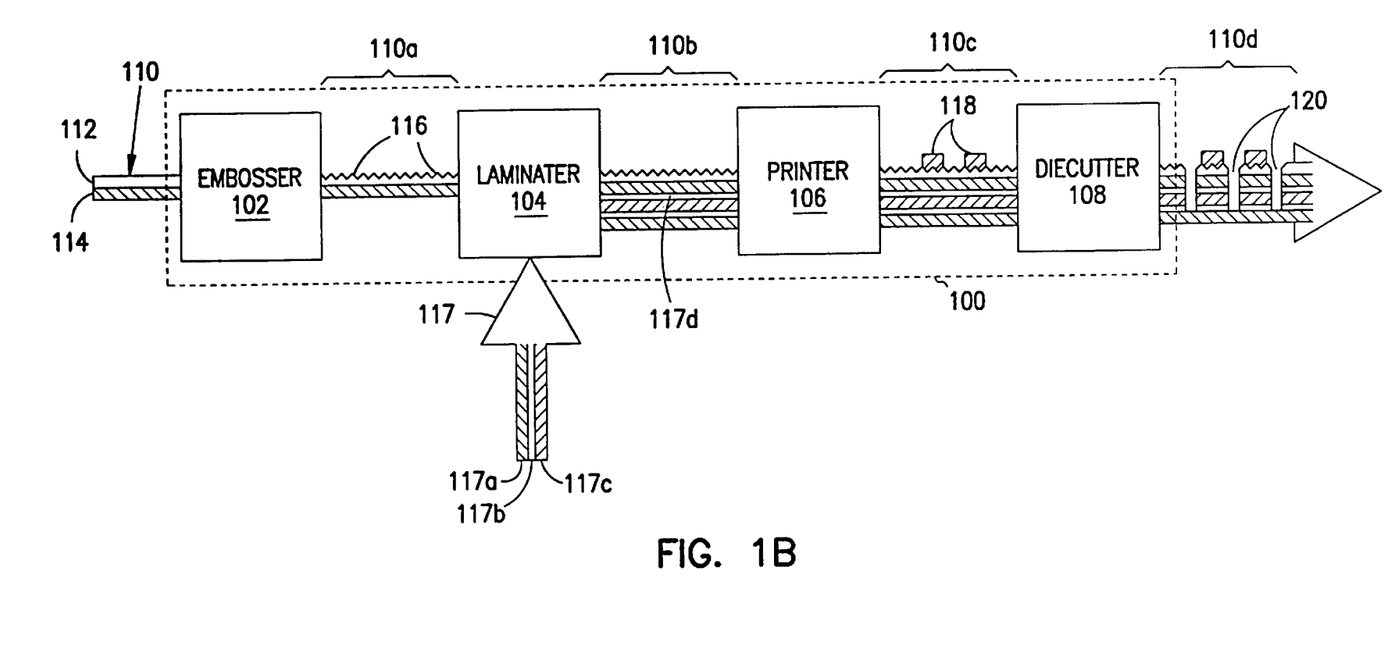
FIG. 1B is a cross-sectional view of apparatus 100, showing an exemplary structure of web 110 and web 117.

FIG. 1B shows a cross-sectional view of web 110 running through embosser 102, laminator 104, printer 106, and diecutter 108. This view shows that section 110a, the pre-embosser section of web 110, includes two layers; a transparent plastic layer 112 and a reflective layer 114. Layer 114, in the exemplary embodiment, comprise one or more metals, such as aluminum, gold, an alloy of such metals, or more generally, any reflective material affixable to layer 112. Also, this view shows embossed regions 116, print regions 118, and diecut regions 120. Other embodiments reverse the position of the plastic and metallized layers so that embossing occurs on the metalized side of the web and backing 117 is applied to layer 112.

More importantly, however, FIG. 1B shows an exemplary structure of backing web 117 and an exemplary structure representative of its lamination with web 110 in sections 110b–110e. In particular, exemplary backing web 117 includes three layers: a paper layer 117a, a pressure-sensitive-adhesive layer 117b, and a release-backing layer 117c. This type of backing is sometimes called a transfer tape. (Transfer tape can be purchased from a variety of manufacturers and vendors in numerous grades, for example, freezer grades, pharmaceutical grades, and so forth.) Release-backing layer 117c can be separated or peeled away from layer 117b, allowing pressure-sensitive-adhesive layer 117b to be applied to an article of manufacture. During lamination, paper layer 117a is glued, using a thermal-sensitive or UV-curable adhesive, represented as layer 117d, to layer 114 of web 110. In some embodiments, backing web 117 consists of only one paper layer; however, the invention is not limited to any number or combination of backing web materials.

Figure 2:
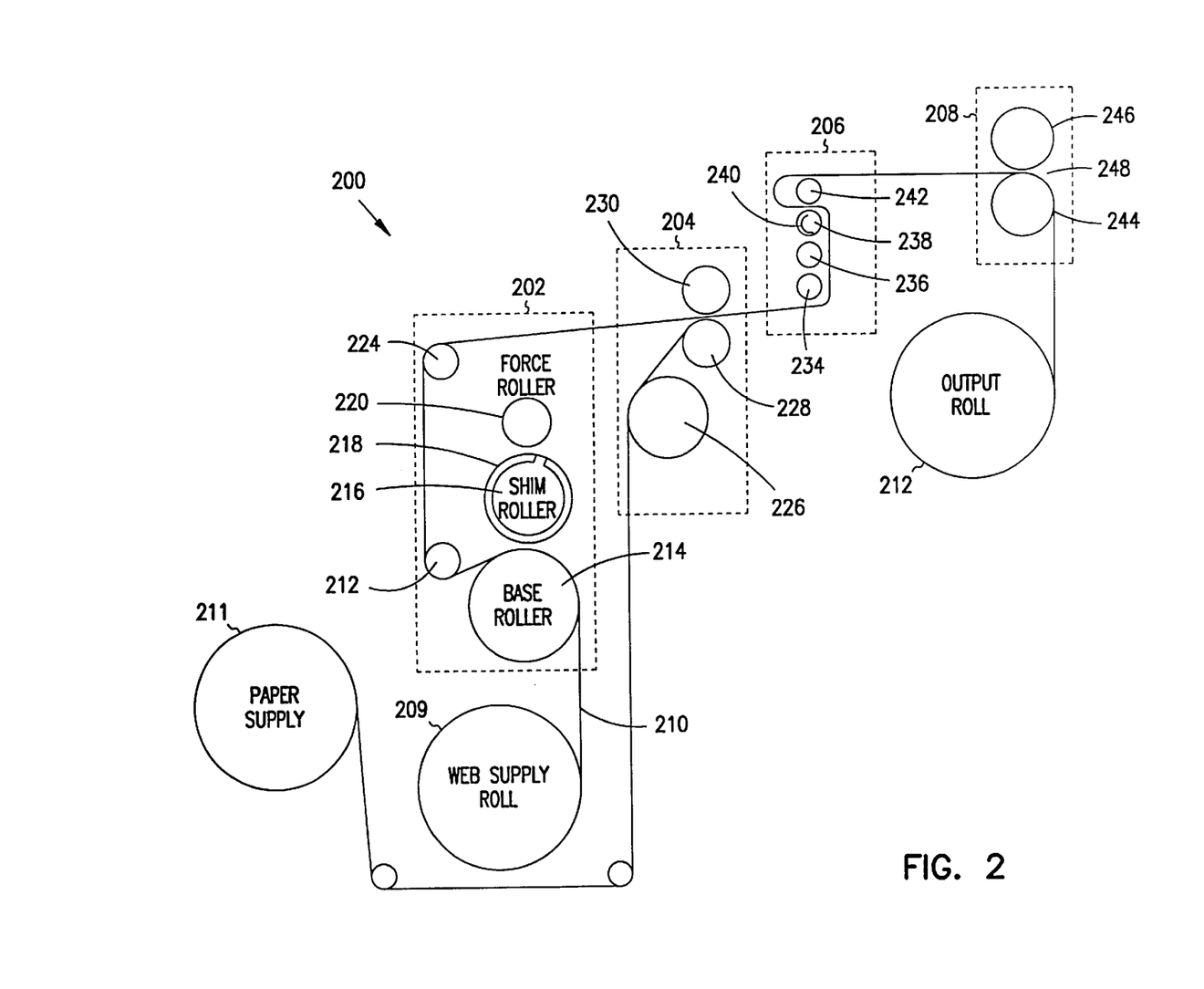
FIG. 2 is a schematic diagram of an exemplary embodiment 200 of in-line rotary web processing apparatus 100, including a rotary embosser 202, a laminator 204, a printer 206, and a die-cutter 208 operating concurrently on a continuous web of material 210.

FIG. 2 shows an exemplary in-line rotary web processing apparatus 200 embodying teachings of apparatus 100. Apparatus 200 includes an exemplary rotary microembosser 202, an exemplary laminator 204, an exemplary printer 206, and an exemplary diecutter 208 operating concurrently on a continuous web 210 which originates from a web supply roll 209 and terminates at output roll 212. In the exemplary embodiment, web 210 comprises a reflective plastic film, such as an aluminized polyester, which is approximately six-to-seven inches (150–180 mm) wide and 0.001 to 0.002 inches (0.0025–0.005 mm) thick. However, the invention is not limited to any particularly web compositions or dimensions. Indeed, other embodiments of the invention use films of polyethylenterephthalate or biaxially oriented polyproplylene, cellulose tri-acetate, polystyrene, polyethylene, and/or polyvinyl chloride.

From supply roll 209, web 210 feeds through exemplary microembosser 202. Microembosser 202 comprises a base roller 214, a shimroller 216, a shim 218, a force roller 220, and guide rollers 222 and 224. More precisely, web 210 feeds over base roller 214 to contact shim 218 held by shimroller 216. (In one embodiment, base roller 214 automatically engages with shimroller 216 during start-up of embosser 200 and disengages during shutdown.) Shim 218 includes one or more reflective and/or diffractive images or patterns, that is, images or patterns which are meant to produce a reflective or diffractive image. Shim 218 embosses or transfers these images into web 210 when pressed against web 210 with sufficient force in a direction perpendicular, or transverse, to the axis of rotation of base roller 214 and shimroller 216. Force roller 220 presses shimroller 218 into base roller 214 to facilitate image transfer from shim 216 to web 210. Maintaining shimroller 216 in a temperature range of 200 to 500° F. (93–260° C.), for example, 400° F. (204° C.), also facilitates image transfer. The temperature, however, should be adjusted generally to match the web materials and web processing rate, with faster rates generally requiring higher shimroller temperatures than slower rates.

From base roller 214, embossed web 210 passes around guide rollers 222 and 224 into laminator 204. The invention is not limited to any particular genus or species of laminator. Indeed, many commercially available printers can be used as laminators or augmented with laminator options. When using a conventional printer without a laminator attachment, one uses an adhesive instead of ink.

Laminator 204 includes a guide roller 226 and pinch rollers 228 and 230. Web 211, which comprises a three-layer structure like that shown for web 117 in FIG. 1A, feeds over guide roller 226 between pinch rollers 228 and 230 where it meets web 210. Webs 210 and 211 are laminated together using a thermal-activated adhesive as they pass through the pinch rollers, before ultimately feeding into printer 206.

Printer 206 can be of any type, for example, a single- or multicolor flexographic or central-impression printer as known in the art. Exemplary types include in-line flexographic, in-line rotary letter press, rotating gravere, rotating screen, central-impression UV rotary letter press. In other embodiments, printer 206 comprises an inkjet- or ion-deposition-type automatic numbering and/or barcoding machine alone or in combination with another printer. In the exemplary embodiment, printer 206 includes one or more stages, for example, seven, though for clarity, only one is shown in FIG. 2. Each stage can be used to apply a different color ink or to apply the same color ink.

Specifically, printer 206 includes an ink-pickup roller 234, a gravure 236, a flex-o-roller 238, a flex-o-plate 240, and a pressure roller 242. Pickup roller 234 transfers ink of a predetermined color to gravure 236, which collects and meters out a predetermined amount of ink to plate 240 as plate 240 rotates conjointly with flexo-roller 238. As the laminated web passes between flex-o-roller 238 and pressure roller 242, ink-bearings areas or regions of plate 240 contact web 210 (or web 211 if so desired), forming a print image on the web. Each revolution of flex-o-roller 238 forms a corresponding printed image on web 210. Thus, repeated revolutions form a printed sequence of images substantially equispaced along the length of web 210. In some embodiments, particularly those with multi-color printing, printer 206 includes one or more ink-drying or ink-curing stations that accelerate the drying or curing of inks. One example of such a station uses ultraviolet light as to accelerate drying or curing.

After printer 206, web 210 and web 211 feed into diecutter 208. Diecutter 208 can take a variety of forms. Manufacturers of suitable commercial diecutters include Webtron, Sanke, and Profiteer. (See also U.S. Pat. No. 4,095,498 which describes another suitable diecutter and which is incorporated herein by reference.) Thus, the invention is not limited to any genus or species of diecutter.

In the exemplary embodiment, diecutter 208 includes an anvil roller 244 and a die cylinder 246 which form a nib 248. As known in the art, webs 210 and 211 feed through nib 246, contacting die cylinder 244 which cuts webs 210 and/or 211 and thus defines individual labels. Diecut webs 210 and 211 exit diecutter 208 onto roll 212. Though not shown in this exemplary embodiment, other embodiments of diecutter 208 include a waste-matrix remover or stripper for separating scrap portions of webs 210 and 211 onto a separate roll. Scrap portions are generally those portions outside the perimeters of any individual label.

Figure 3:
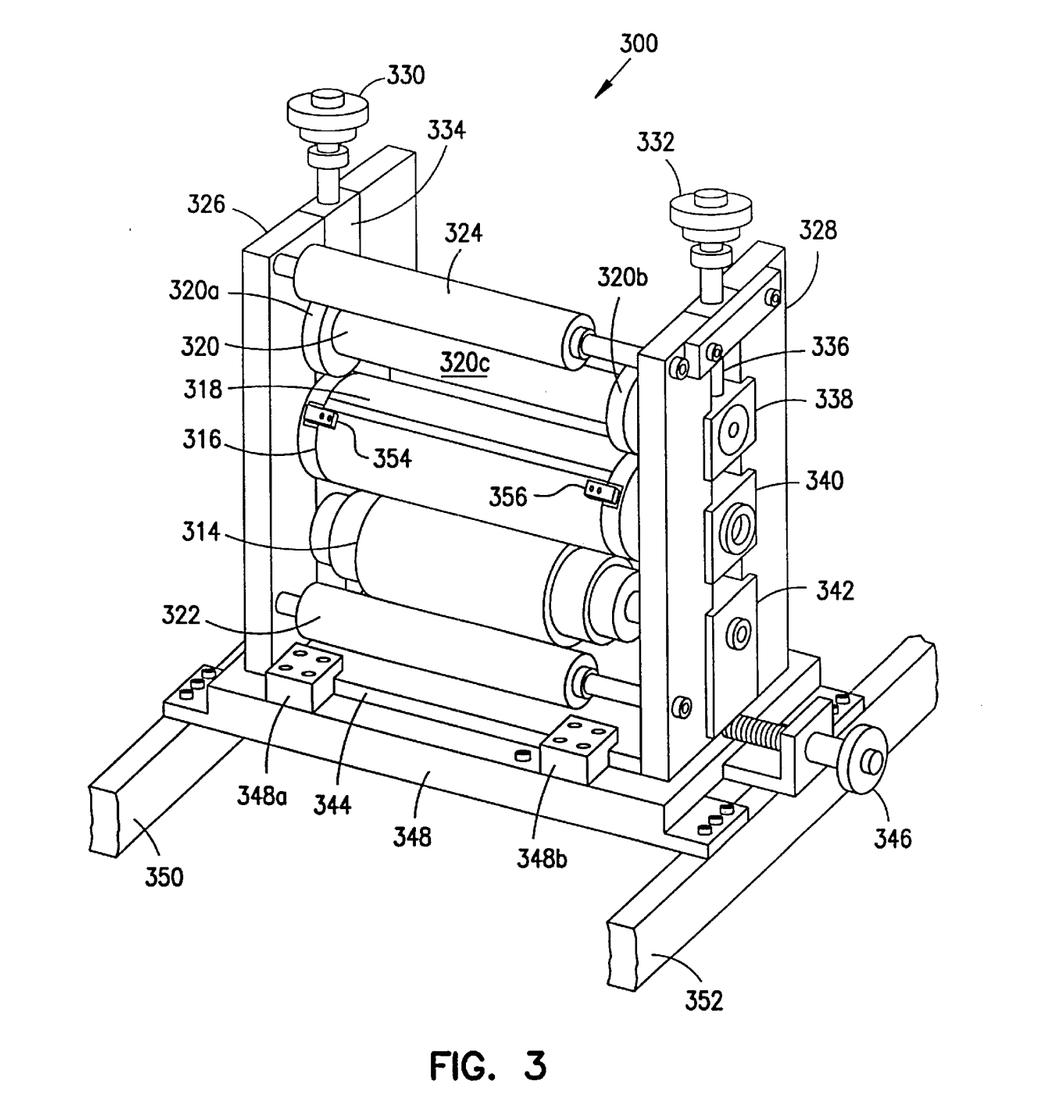
FIG. 3 is perspective view of an exemplary rotary microembosser 300 incorporating teachings of the present invention.

FIG. 3 is perspective view of an exemplary rotary microembosser 300 embodying several inventive concepts. Like microembosser 202 in FIG. 2, microembosser 300 includes a base roller 314, a shimroller 316, a shim 318, a force roller 320, and guide rollers 322 and 324. Additionally, microembosser 300 includes left and right side frame members 326 and 328, left and right force-roller adjustments 330 and 332, left and right bearing block channels 334 and 336, right force-roller bearing block 338, right shimroller bearing block 340, right base-roller bearing block 342, bottom frame plate 344, lateral adjustment mechanism 346, bottom frame support 348, and left and right frame support rails 350 and 352.

More precisely, FIG. 3 shows that base roller 314, shimroller 316, force roller (or bridge assembly) 320 and guide (or idle) rollers 322 and 324 are held in an axially parallel arrangement between left and right side frame members 326 and 328. Left and right side frame members 326 and 328 are attached respectively to opposing sides of bottom frame plate 344. Frame plate 344 has a front edge 344a which engages with front guide clips 348a and 348b of bottom frame support 348. Frame plate 344 also has a back edge (not shown) which engages with two back guide clips (also not shown.) Bottom frame support 348 is attached to left and right frame support rails 350 and 352, which, in the exemplary embodiment, are attached to or stem from a printer support frame (not shown.) Frame plate 344 can be moved laterally or transversely relative to bottom frame support 348 and support rails 350 and 352 using lateral adjustment mechanism 346. Thus, one can adjust the lateral alignment of base roller 314, shimroller 316, force roller 320 and guide rollers 322 and 324 relative to support rails 350 and 352 and other web processing equipment, such as a laminator, printer, diecutter, or even another embosser.

Base roller 314, shimroller 316, and force roller 320 are supported between left and right side frame members 326 and 328. To this end, right bearing-block channel 334 engages with right bearing blocks 338, 340, and 342, and left bearing block channel 336 engages with corresponding left bearing blocks (not shown in this view.) Each right-left pair of bearing blocks engages with a corresponding spindle portion of respective rollers 314, 316, and 320.

More particularly, force roller 320 includes two end (radial bearing) portions 320a and 320b and a center portion 320c, with the end portions having a greater diameter than that of the center portion. End portions 320a and 320b contact corresponding portions of shimroller 316. Left and right force-roller adjustments 330 and 332 screw down onto the bearing blocks for force roller 320, allowing one to adjust the force that roller 320 applies to shimroller 316 and therefore the force shim 318 exerts on base roller 314. In the exemplary embodiment, end portions 320a and 320b have a diameter of 3.0 inches (76 mm) and length (or width) of 0.75 inches (19 mm); center portion 320c has a diameter of 1.375 inches (35 mm) and a length of 16.0 inches (406 mm); and the end and center portions are made of steel. However, the invention is not limited to any particular dimensions, composition, or form of force roller 320.

Shimroller 316 includes unique shimclamps 354 and 356 which clamp one edge of shim 318, for example, its leading edge, to shimroller 316. The remainder of shim 318 wraps around shimroller 316. In the exemplary embodiment, the circumference of shimroller 316 is greater than the length of shim 316 to prevent the shim from overlapping itself. More precisely, in the exemplary embodiment, shim 318 has a length of about 11.990–11.995 inches (304–305 mm) and the circumference of shimroller 316 is about 12.0 inches (305 mm), providing a gap of about 0.0050–0.010 inches (0.5–1.0 mm) between the ends of the wrapped shim. Though not necessary, the gap is desirable to facilitate thermal expansion of the shim during operation of the embosser.

Figure 3A:
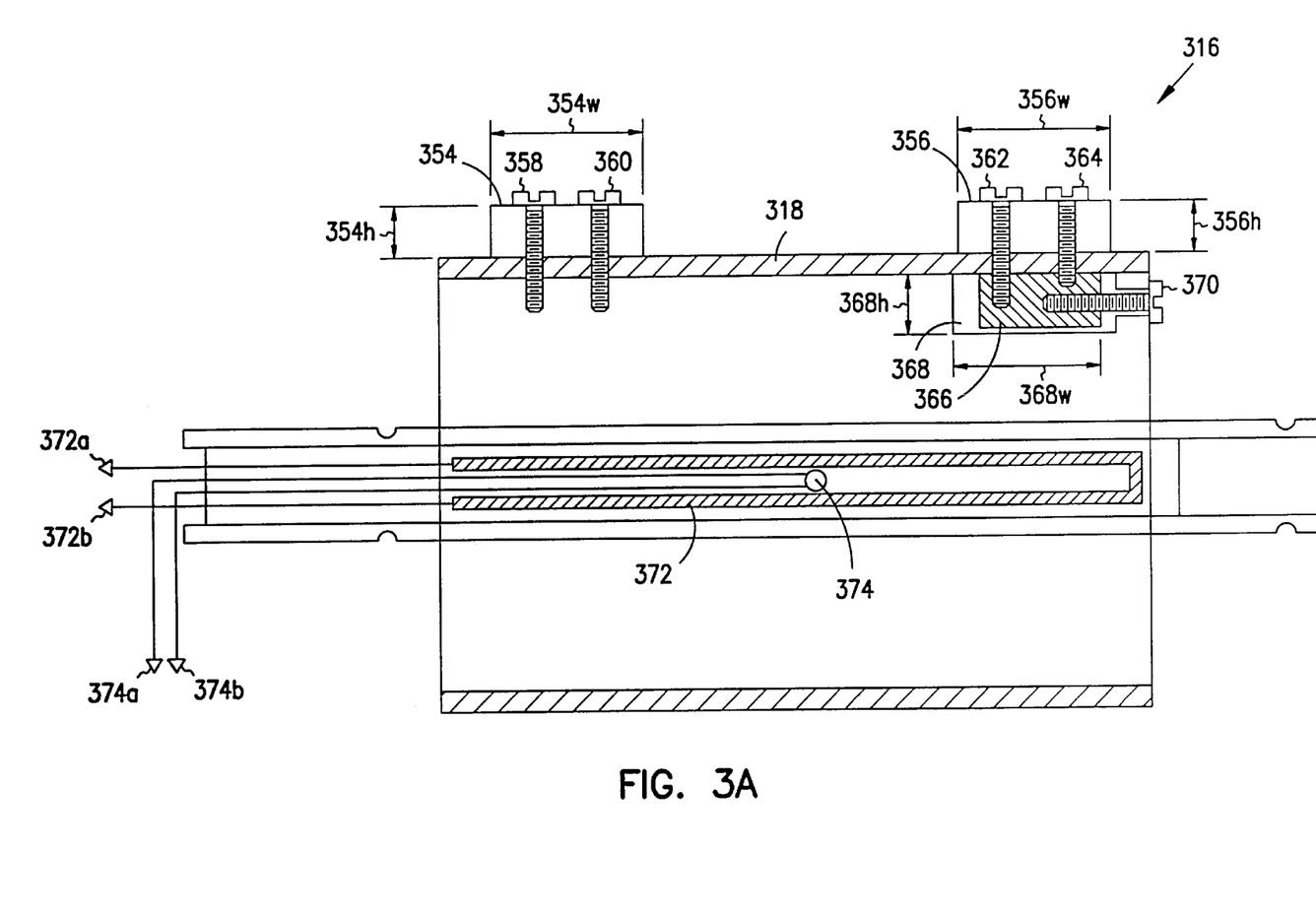
FIG. 3A is a simplified cross-sectional view of shimroller 316.

FIG. 3A, a simplified center-cross-sectional view of shimroller 316 shows details of shimclamps 354 and 356. In particular, this view shows that shimclamp 354 is fixed to the surface of shimroller 316 via fasteners 358 and 360 which, in the exemplary embodiment, are screwed into a pair of tapped holes, thereby pinching a portion of shim 318 between clamp 358 and a portion of shimroller 316. In the exemplary embodiment, shimclamp 354, which is formed of steel, has a width (or length) 354$w$ of 0.75–1.00 inches (19–25 mm), a height 354$h$ of 0.25 inches (6 mm), and depth of 0.75 inches (19 mm) (not shown.)

Shimclamp 356, on the other hand, is fixed via two screws 362 and 364 to a movable—more precisely, a laterally movable—block 366 that rests in a rectangular recess 368 in shimroller 316. Block 366 is fastened to roller 316 via an adjustment screw 370 that allows one to adjust the lateral (or axial) position of shimclamp 356 and block 366 relative to shimroller 316 and embosser 300. In some embodiments, a coil spring or other spring or positional-bias mechanism biases block 366 toward the near or far end of shimroller 316, that is, toward the left or right side of recess 368 Therefore, using lateral-adjustment screw 370 allows one to move shimclamp 356 laterally relative to shimclamp 354, and thus to ensure that at least the leading edge of shim 318 lays substantially flat against the cylindrical surface of shimroller 316.

In other embodiments, shimclamps 354 and 356 (and related components) mirror each other in structure and function. For example, one embodiment includes left and right shimclamps that both resemble shimclamp 354, and another embodiment includes two shimclamps that both resemble shimclamp 356. This latter embodiment thus allows one to move a left and right shimclamp using a respective adjustment screw.

FIG. 3A also shows that shimroller 316 includes an internal heating element 372 with power leads 372$a$ and 372$b$. The exemplary embodiment, shimroller 316 further includes a temperature sensor 374 within (that is, interior to the outermost or exterior surface of) shimroller 316 or within the volume defined by installed shim 318. Temperature sensor 374 includes sensor-output leads 374$a$ and 374$b$. The heating element and temperature sensor, both of which rotate in unison with shimroller 316, are electrically connected through a rotary electrical union (not shown) to a conventional temperature-control circuit (also not shown.) The exemplary embodiments provides the heating element and temperature sensor as a heating cartridge. One example of a commercially available heating cartridge is the 208-volt, 2500-watt, FIREROD™ heating cartridge from WatLow, Inc. of St. Louis, Mo. This heating cartridge, has a diameter of about 0.75 inches (19 mm), includes an internal J-type thermocouple for sensing the temperature of the element.

In contrast to conventional shimrollers that use external temperature sensors to sense the surface temperature of the shimroller, the use of an internal temperature sensor, such as sensor 374, provides superior control of the temperature of shimroller 316. Exterior placement of the sensor leads to undesirable temperature oscillation during operation of the embosser, which in turn leads to melting or burning the shim or the web or to under or over embossing of the web and consequent web waste. Placing the temperature sensor inside the shimroller mitigates or eliminates these problems.

Figure 3B:
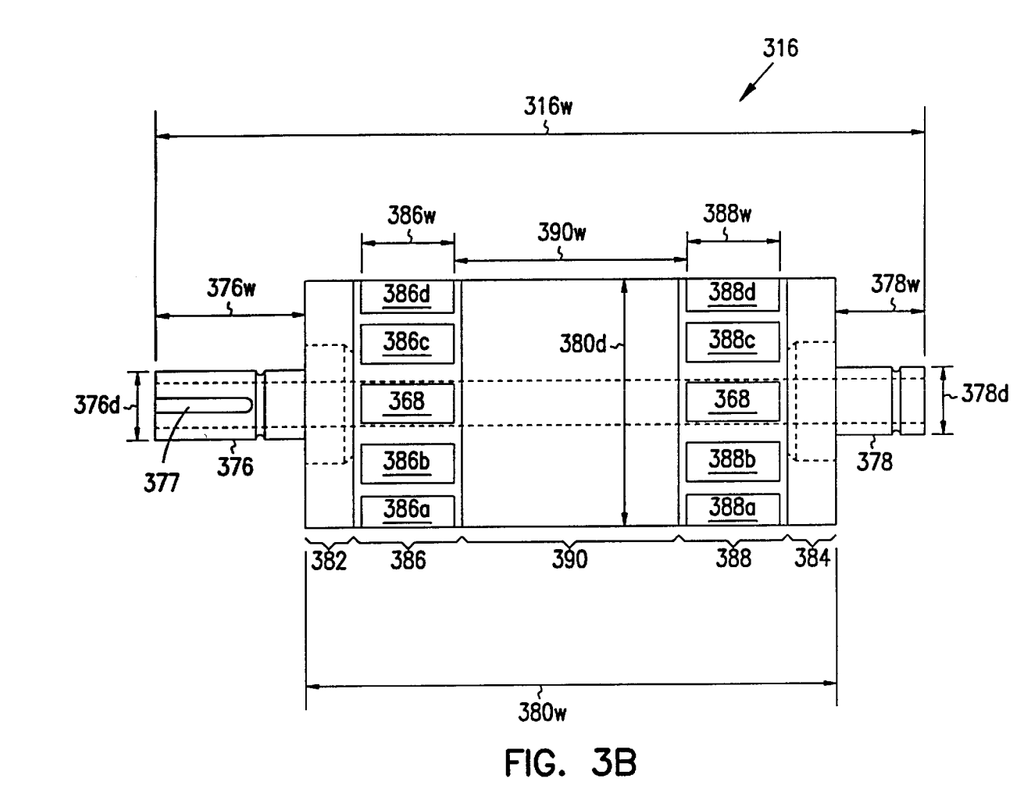
FIG. 3B is a top view of shimroller 316.

FIG. 3B is a front view of shimroller 316 without shim 318, showing several features of the exemplary embodiment not visible in FIGS. 3 or 3A. In particular, shimroller 316 has a total width 316$w$ of 21.75 inches (550 mm), including a left spindle portion 376 having a width 376$w$ of 6.5 inches (165 mm) and a diameter 376$d$ of 1.25 inches (32 mm) and a right spindle portion 378 having a width 378$w$ of 2.5 inches (64 mm) and diameter 378$d$ of 1.25 inches (32 mm). Left spindle portion 376 includes a 1.1 8-inch-by-0.056-inch-by-0.25-inch (30$33$ $1.5\times6$ mm) groove 377.

Between spindle portions 376 and 378 is a roller portion 380, which has a diameter 380$d$ of about 3.8–3.9 inches (97–99 mm) and a width 380$w$ of 12.75 inches (324 mm). Roller portion 380 includes left and right bearer regions 382 and 384, left and right magnetic regions 386 and 388, and a center region 390. Bearer regions 382 and 384, which are about 0.75 inches (19 mm) wide in this embodiment, contact respective end portions of force roller 320 as shown in FIG. 3. In this exemplary embodiment, magnetic region (or band) 386 include one or more permanent magnets—for example, 386$a$, 386$b$, 386$c$, and 386$d$—inset around its circumference. Magnetic region 386 also includes recess 368 which mates with block 366 as shown in the cross-sectional view of FIG. 3A. Magnetic region (or band) 388 includes one or more permanent magnets—for example, 388$a$, 388$b$, 388$c$, and 388$d$—inset around its circumference. In the exemplary embodiment, magnets 386 and 388 have respective widths 386$w$ and 388$w$ of about 2.0 inches (51 mm), heights 386$h$ and 388$w$ of about 0.75 inches (19 mm), and depths (not shown) of about 0.75 inches (19 mm). The magnets in the exemplary embodiment are at least strong enough to hold the trailing edge of shim 318 against shimroller 316 during its maximum rate of operation. The magnets need not be of the same strength or size, although ideally they have substantially the same mass and mass distributions to facilitate balanced rotation of the shimroller.

Figure 3C:
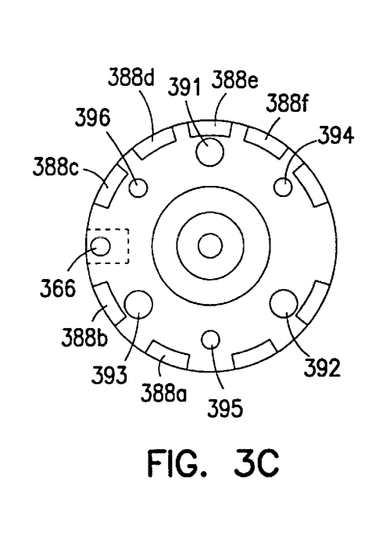
FIG. 3C is a side view of shimroller 316.
Figure 3D:
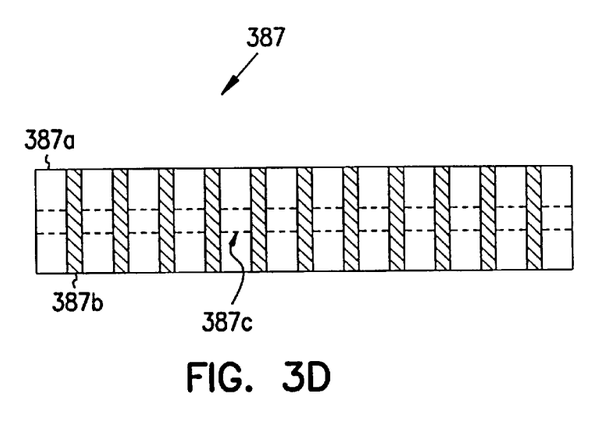
FIG. 3D is a top view of an exemplary magnetic assembly 387.
Figure 3E:
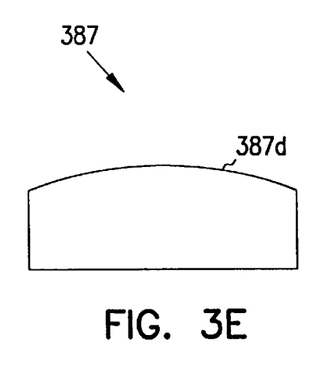
FIG. 3E is a side view of exemplary magnetic assembly 387.

FIGS. 3D and 3E show a respective top and side view of a magnetic assembly 387 used for each of the 22 magnets 386 and 388 in the exemplary embodiment of FIG. 3B. Magnetic assembly 387 includes an interleaved arrangement of 12 permanent ceramic-magnet plates 387$a$ and 12 ferromagnetic plates 387$b$, with a ferromagnetic plate between each adjacent pair of ceramic-magnet plates. This arrangement provides seven poles per inch. A ferromagnetic dowel, or rod, 387$c$ extends through a hole in each magnetic and ferromagnetic plate. A high-temperature epoxy adhesive secures each interleaved assembly of magnetic and ferromagnetic plates in a recess corresponding to a position of one of magnets 386 and 388. FIG. 3E shows that each plate in the assembly has a top radial edge 387$d$ sized to meet flush or substantially flush with the surface of the shimroller.

The invention, however, is not limited to any particular number, strength, arrangement, construction, dimensions, or attachment of magnets to shimroller 316. For example, one embodiment includes only one pair of magnets to hold the trailing edge of shim 316 or include a single magnetic member that extends across most or all of roller portion 380 or across most or all of center portion 390 to hold a trailing edge portion of the shim. Other embodiments form one or both of magnetic regions 386 and 388 as a continuous magnetic band encircling an eighth, a quarter, a half, or the whole of shimroller 316, for example. Moreover, still other embodiments use one or more electromagnetic members to define a particular magnetic region.

More generally, the inventors contemplate extension of their teachings to use an attractive force, such as magnetism, to hold a shim to using other attractive forces, such as electrostatic forces or negative pressures. A negative pressure or vacuum embodiment would likely entail providing one or more orifices at strategic points of the shimroller, for example, within regions 386 and 388, with each orifice communicatively coupled to a negatively pressurized axial bore in the shimroller, such as axial bore 392 in FIG. 3B. The axial bore would, in turn, be coupled to a pump to develop a negative pressure, that is, a pressure less than that of the ambient environment.

FIG. 3C is a side view of shimroller 316, showing location of magnets 386 and location of block 366 and recess 368 used with shimclamp 356 (of FIGS. 3 and 3A.) More particularly, FIG. 3C shows three equispaced fasteners 391–393 which secure portion 384 to portion 388 of shimroller 316. It also shows three equispaced jack-screws 394–396, which facilitate separation of portion 384 from portion 388 during disassembly of shimroller 316. Portions 382 and 386 are similarly secured and disassembled.

Figure 4A:
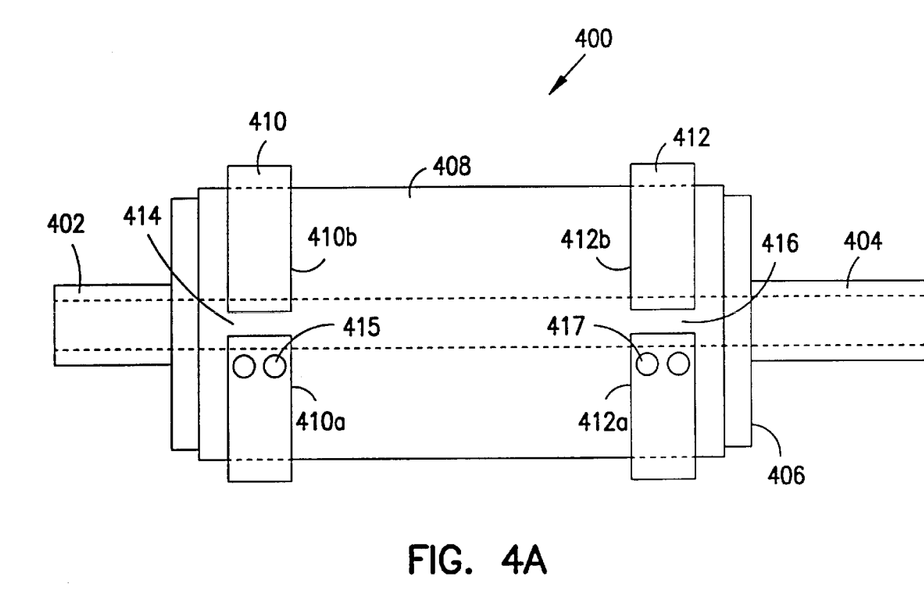
FIG. 4A is a top view of an alternative shimroller 400.
Figure 4B:
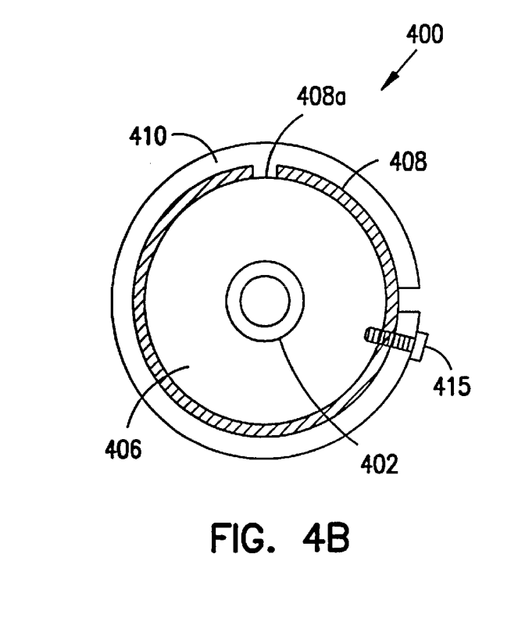
FIG. 4B is a side view of shimroller 400.

FIGS. 4A and 4B show respective top and side views of an alternative shimroller 400 which embodies principles that can be used independently or jointly with one or more other teachings embodied in shimroller 316. Specifically, shimroller 400 includes respective left and right spindle portions 402 and 404 and a roller portion 406. Roller portion 406 is almost entirely surrounded by a shim 408 which is more clearly shown in the side view of FIG. 4B. Holding shim 408 against roller portion 408 are respective left and right shimcollars (or shimrings) 410 and 412, which, include respective ends 410a and 410b and 412a and 412b. End 410a is fastened or secured to shimroller 400 via screws or pins 415. Similarly, end 412a is fastened to shimroller 400 via screws or pins 417.

FIG. 4B shows that shimcollars 410 and 412 span over a gap 408a between the leading and trailing edges 408b and 408c of shim 408. Additionally, FIG. 4B shows that screws or pins 415 (and 417) extend through shim 408 into the cylindrical surface of shimroller 400. One embodiment of shimroller 400 fastens ends 410a and 412a to shimroller 400 in a fashion analogous or similar to that illustrated using shimclamps 354 and/or 356 in FIG. 3A. Thus, one can laterally (or axially) adjust one or both shimcollars relative the shimroller to ensure a good fit between a shim and the surface of the shimroller.

In this exemplary embodiment, ends 410a and 410b and ends 412a and 412b are separated by respective gaps respective gaps 414 and 416. However, in other embodiments, one or more of shimcollars 410 and 412 forms a closed loop when installed on shimroller 400 with shim 408 in place. Though not shown here, other embodiments include screws that adjust the spacing between ends 410a and 410b and between ends 412a and 412b, and/or secure end 410a to end 410b and end 412a to end 412b. Shimcollars 410 and 412, which are formed of steel in the exemplary embodiment, have an interior diameter that matches that of roller portion 406 plus the nominal thickness of shim 408.

In other embodiments, the length of one or more of the shimcollars is substantially less than that necessary to fully encircle the roller portion of shimroller 400. For example, the shimcollars can be three-fourths, one-half, one-forth, one-eighth, or one-sixteenth of the circumstance, with one end attached to the shimroller to fasten a portion of the leading edge of shim 408 to the shimroller and the other end overlapping the trailing edge of the shim to prevent it from being centrifugally separated from the shimroller during embossing.

Figure 4C:
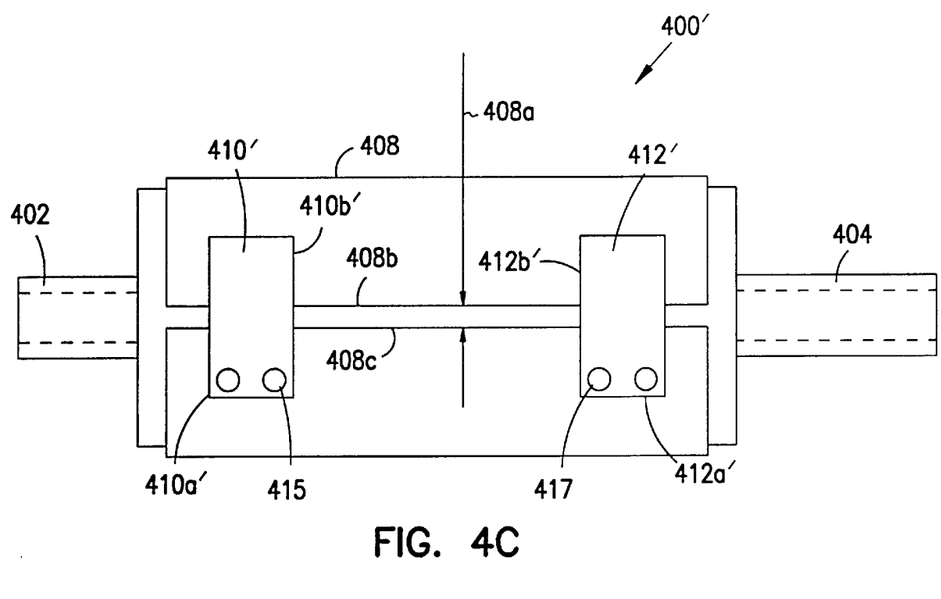
FIG. 4C is a top view of another alternative shimroller 400'.
Figure 4D:
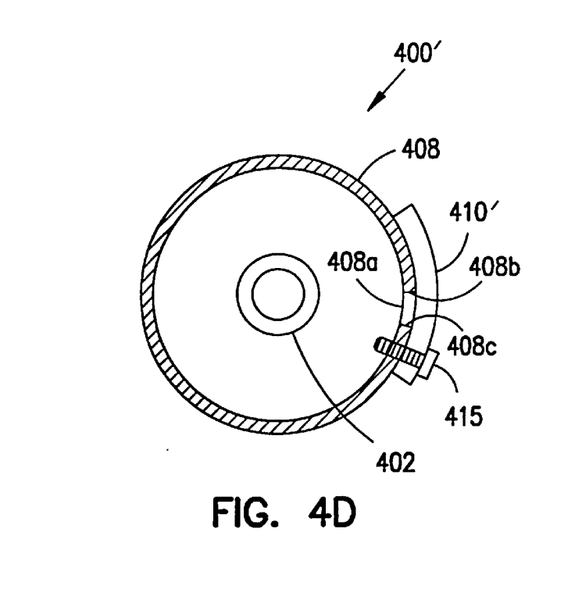
FIG. 4D is a side view of shimroller 400'.

FIGS. 4C and 4D show respective top and side view of an such an alternative shimroller 400'. In particular, FIG. 4C shows short shimcollars 410' and 412', which, as measured from respective ends 410a' and 412a' to ends 410b' and 412b', are about one-third or one-fourth the circumference of the shim-mount surface of shimroller 400'. Each of the shimcollars spans a gap 408a between the leading and trailing edges of shim 408. To improve rotational balance in some embodiments, the inventors contemplate counterbalancing the mass of some shimcollars by internally weighting shimroller 400'.

Figure 5:
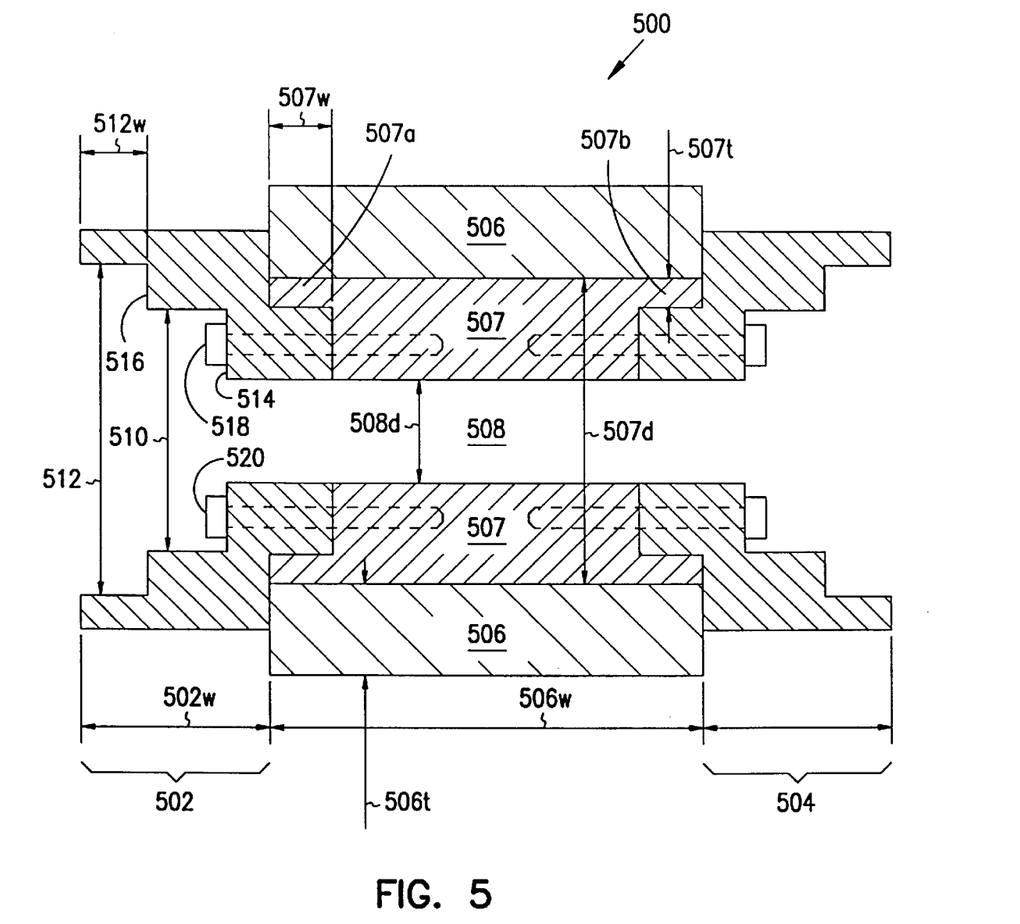
FIG. 5 is a cross-sectional view of a base roller 500.
Figure 6A:
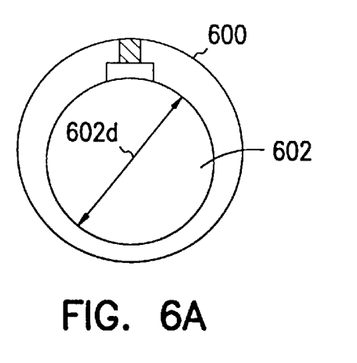
FIG. 6A is a front view of a cam 600 for raising or lowering a base roller relative a shimroller.
Figure 6B:
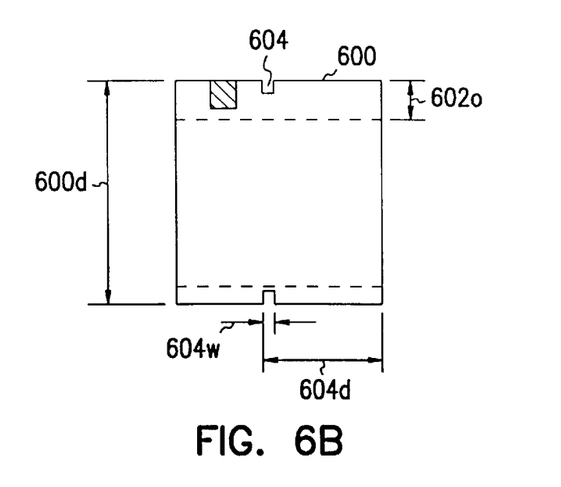
FIG. 6B is a side view of cam 600.
Figure 7A:
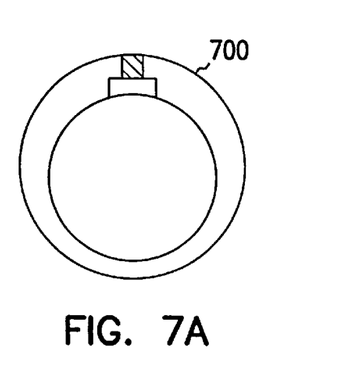
FIG. 7A is a front view of another cam 700 for raising and lowering a base roller relative a shimroller.
Figure 7B:
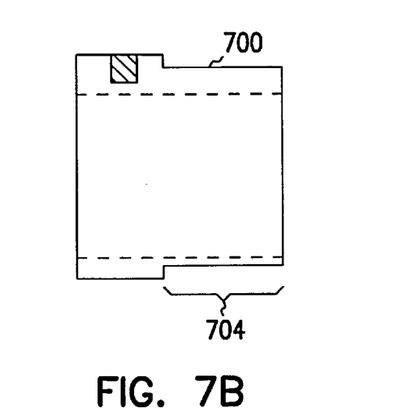
FIG. 7B is a side view of cam 700.

FIG. 5 is a cross-sectional view of a base roller 500 which may be used as base roller 214 in FIG. 2 or base roller 314 in FIG. 3. Base roller 500 includes left and right symmetrical bearing portions 502 and 504, an central roller portion 506, an axial bore 508. Axial bore 508 has a diameter 508d of 1.25 inches (32 mm), for example. Left and right symmetrical bearing portions 502 and 504, which are made of steel in the exemplary embodiment, have respective widths 502w and 504w of approximately 2:125 inches (54 mm) and include stepped axial bores 510 and 512. Bearing portion 502 is mounted to inner portion 507 via four fasteners, two of which are shown as fasteners 518 and 520. Axial bore 510, which provides clearance for the four fasteners, has a diameter of about 2.0 inches (51 mm) and extends 1.0 inches (54 mm) into the interior of base roller 500, forming an inner annular shoulder 514. Axial bore 512 defines an outer annular shoulder 516 and receives a bearing (not shown). The exemplary embodiment uses a bearing which complies with the NTN6207 bearing standard.

Central roller portion 506 has a diameter of about 4 inches (102 mm) and forms a sleeve around inner portion 507, which has a diameter 507d of about 2.5 inches (64 mm). Portion 507 has outer annular ring portions 507a and 507b with a thickness 507t of 0.1875 inches (5 mm) and a width 507w of 0.5 inches (13 mm), for example. Central roller portion 506 has a width 506w of about 6.25 inches (159 mm) and a thickness 506t of about 1.0 inch (25 mm). In the exemplary embodiment, roller portion 506 comprises a polyimide, such as TORLON™4501 polyimide from Amoco Corporation or VESPELL™ polyimide from Dupont, or a polyethcreter ketone, such as PEEK™ polyethcreter ketone from VicTrex Incorporated. TORLON™ polyimide and PEEK™ polyethcreter ketone materials provide performance advantages over the VESPELL™ polyimide as well as the steel, both of which are used conventionally. In particular, the TORLON™ polyimide unexpectedly enhances shimlife and thus reduces manufacturing cost. The PEEK™ polyethcreter ketone is expected to provide similar advantages.

In further contrast to conventional base rollers which have an initial diameter of about 8 inches (204 mm), exemplary base roller 500 has a diameter of about 4 inches (102 mm). The use of a smaller diameter dramatically reduces the weight of the base roller and facilitates maintenance activities, such as re-turning or re-shaping the base roller to ensure a good work surface. The conventional 8-inch (204 mm) base rollers are not only difficult to install and remove because of their weight but also require more frequent removal and installation because of their use of the VESPELL™ polyimide. Therefore, the exemplary embodiment's use of a single base roller that is smaller, lighter, and more durable provides significant improvement.

FIGS. 6A and 6B, 7A and 7B show front and side view of respective exemplary cams 600 and 700 which can be used with base roller 500, specifically to raise and lower it about 0.125 inches (3 mm) during operation of microembosser 200 or 300. A pair of cams 600 (or a pair of cams 700) fit inside the bearings of base roller 500 and engage with a rotary actuator (not shown.) Cam 600, which includes an interior bore 602 and a retaining-ring groove 604, has an exemplary exterior diameter 600d of about 1.378 inches (35 mm).

Interior bore 602, which is offset by an exemplary distance 602o of about 0.125 inches (3 mm) or 0.25 inches (6 mm) from the center of the cam, has an exemplary interior bore diameter 600i of about 1.0 inches (25 mm). Retaining-ring groove 604 has a width of 604w of about 0.0625 inches (2 mm) and is positioned a distance 604d, for example 0.675 inches (17 mm), from one face of the cam. Cam 700, which has exemplary dimension (not labeled) similar to cam 600, replaces retaining-ring groove 604 with a smaller-diameter region 704.

At startup of in-line apparatus 200 in FIG. 2, the rotary actuator, for example a pneumatic rotary actuator, rotates the cams, thereby raising the base roller and bringing a web, such as web 210, into contact with a shim, such as shim 218. Conversely, when the apparatus or microembosser stops or receives a stop command, the actuator automatically rotates the cams to lower the base roller and separate the web from the shim, which is typically heated through the shimroller. Automatic separation prevents the stopped or decelerating web from melting or severing because of continued contact with the heat shim. In contrast conventional microembosser include a manually engaged lever mechanism to move the base roller toward or away from the shimroller. This arrangement requires human operators to remember to engage the lever and is therefore prone to human error.

In some embodiments, a timer delays operation of the rotary actuator for a specific time after start up of the in-line apparatus or the microembosser to allow all portions of the apparatus to reach their intended operating speeds. One or more of the web processing devices, such as printer 206 or diecutter 208, may have masses that require appreciable time to accelerate to an intended operating speed. Other embodiments use the timer to also delay engagement of the shimroller and base roller until the shimroller reaches a desired operating temperature, thereby reducing web waste.

Furthermore, other embodiments of the invention use a similar cam-arrangement or other axial-lifting mechanism to raise or lower the shimroller relative the base roller, or to move both the shimroller and base roller toward each other. Thus, this aspect of the invention encompasses not just raising or lowering either the base roller or the shimroller but more generally automatically moving either the base roller or the shimroller relative the other.

Conclusion

In furtherance of the art, the inventors have devised an in-line apparatus which includes a microembosser in combination with one or more other web-processing devices, such as laminator, printer, or diecutter. The exemplary embodiment of the in-line apparatus includes a unique exemplary microembosser which includes several unique features. Among these are a shimroller with one or more leading-edge shimclamps, one or more magnetic shimholding members, and one or more internal temperature sensors. Additionally, the exemplary microembosser includes a unique base or anvil roller incorporating a superior material and having a mechanism for automatically separating the base roller from the shimroller when the microembosser stops.

The embodiments described above are intended only to illustrate and teach one or more ways of practicing or implementing the present invention, not to restrict its breadth or scope. The actual scope of the invention, which embraces all ways of practicing or implementing the invention, is defined by the following claims.

What is claimed is:

1. Apparatus comprising an embosser, a laminator, a printer, and a diecutter arranged in a line to operate concurrently on at least one continuous web, with the printer arranged to receive a portion of the one continuous web after the laminator receives it and the embosser arranged to receive the portion of the one continuous web before any printing.

2. Apparatus comprising an embosser arranged in line with a laminator, and a printer to operate concurrently on at least one continuous web, with the printer arranged to receive a portion of the one continuous web after the laminator receives it and the embosser arranged to receive the portion of the one continuous web before any printing.

3. Apparatus comprising:
    an embosser for embossing reflective or diffractive images onto a first continuous web;
    a laminator aligned with the embosser for receiving the first continuous web and laminating a second continuous web to the first continuous web while the embosser embosses the reflective or diffractive images on the first continuous web;
    a printer aligned with the laminator for receiving the first and second laminated webs and printing on the first continuous web while the embosser embosses the reflective or diffractive images on the first continuous web, with the printer arranged to receive the one continuous web after the embosser receives it; and
    a diecutter aligned with the printer for receiving the first and second webs and diecutting the first or second webs while the embosser embosses the reflective or diffractive images on the first continuous web and the printer prints on the first continuous web;
    wherein the embosser is arranged to emboss a portion of the one continuous web before the apparatus prints on the portion.

4. The apparatus of claim 3 wherein the embosser includes a shimroller and means for attracting a shim to at least a portion of the shimroller.

5. The apparatus of claim 3 wherein the embosser includes at least one base roller, with the base roller having a work surface comprising a polyimide or a polyamide.

6. The apparatus of claim 3 wherein the embosser includes:
    a shimroller;
    at least one base roller; and
    means for automatically raising the base roller relative the shimroller in response to starting the embosser and lowering the base roller relative the shimroller in response to stopping the embosser.

7. The apparatus of claim 3 wherein the embosser includes means for holding an embossing shim, comprising:
    one or more shimclamps for clamping a portion of the shim; and
    one or more magnetic members for magnetically attracting one or more portions of the shim.

8. The apparatus of claim 3, where the embosser is configured to emboss holographic images.

9. The apparatus of claim 3, wherein the embosser comprises a roller having an internal heating element.

10. The apparatus of claim 9, further comprising at least two separate shimclamps for clamping an embossing shim to the roller.

11. The apparatus of claim 10, wherein at least one of the shimclamps is laterally adjustable relative the other shimclamp.

12. Apparatus comprising:

embossing means for embossing holographic images onto a first continuous web;

laminating means aligned with the embossing means for receiving the first continuous web and laminating a second continuous web to the first continuous web;

printing means aligned with the laminator to receive the first and second laminated webs and to print on the first or the second continuous web; and diecutting means aligned with the printer to receive the first and second webs and to cut the first and second webs; and wherein the embossing, laminating, printing, and diecutting means are arranged to operate concurrently on respective portions of the first continuous web and the embossing means is arranged to emboss a portion of the first continuous web before any printing.

13. Apparatus comprising:

a rotary embosser for embossing one or more reflective or diffractive images onto a continuous web;

a rotary printer aligned with the rotary embosser for printing on a portion of the continuous web while the embosser embosses another portion of the web; and a rotary diecutter aligned with the printer for diecutting a portion of the continuous web while the embosser and the printer respectively emboss and print other portions of the web;

wherein the embosser is arranged to emboss a portion of the continuous web before the apparatus prints on the portion.

14. The apparatus of claim 13 wherein the rotary embosser is placed ahead of the diecutter to process a portion of the continuous web before the portion is processed by the diecutter.

15. Apparatus comprising:

an embosser for embossing reflective or diffractive images onto a continuous web;

a printer aligned with the embosser for printing on the continuous web while the embosser embosses reflective or diffractive images on the continuous web, the printer arranged to receive a portion of the continuous web after the embosser receives it; and a diecutter aligned with the printer for receiving and diecutting the continuous web while the embosser embosses the reflective or diffractive images on the continuous web and the printer prints on the continuous web;

wherein the embosser is arranged to emboss reflective or diffractive images onto aa portion of the continuous web before the apparatus performs any printing on the portion.

16. Apparatus comprising:

a rotary microembosser for embossing a continuous web; and a web-processing assembly aligned with the rotary microembosser for processing the continuous web during operation of the rotary microembosser, wherein the web-processing assembly comprises two or more of a laminator, a printer, a diecutter, and an automatic number printer and wherein the rotary micro-embosser is arranged to emboss a portion of the continuous web before the apparatus prints on the portion.

17. Apparatus comprising:

an embosser for embossing reflective or diffractive images onto a continuous web;

a laminator aligned with the embosser for receiving the continuous web and laminating a pressure-sensitive adhesive backing web to the continuous web, while the embosser embosses the reflective or diffractive images onto the continuous web; and a printer aligned with the laminator for receiving the continuous web and the pressure-sensitive adhesive backing web;

wherein the embosser is arranged to emboss a portion of the continuous web before the apparatus prints on the portion.

18. The apparatus of claim 17, wherein reflective or diffractive images include holographic images.

19. Apparatus comprising:

an embosser for embossing reflective or diffractive images onto a first continuous web;

a laminator aligned with the embosser for receiving the first continuous web and laminating a second continuous web to the first continuous web while the embosser embosses the reflective or diffractive images on the first continuous web;

a printer aligned with the laminator for receiving the first and second laminated webs and printing on the first continuous web while the embosser embosses the reflective or diffractive images on the first continuous web, with the printer arranged to receive the one continuous web after the embosser receives it; and a diecutter aligned with the printer for receiving the first and second webs and diecutting the first or second webs while the embosser embosses the reflective or diffractive images on the first continuous web and the printer prints on the first continuous web;

wherein the embosser comprises a roller having an internal heating element, and at least two shimcollars for clamping an embossing shim to the roller, with each shimcollar spanning a gap between a trailing edge and a leading edge of the embossing shim when the embossing shim is clamped to the roller.

20. The apparatus of claim 19, wherein at least one of the at least two shimcollars is laterally adjustable relative the other shimcollar.

21. The apparatus of claim 19, wherein the roller has a cirumference and each of the at least two shimcollars forms an arc having a length more than one half the circumference.

* * * * *